United States Patent [19]
Malaney et al.

[11] 3,788,302
[45] Jan. 29, 1974

[54] MAINTAINING THE WATER LEVEL IN BAKING BEANS

[75] Inventors: Samuel T. Malaney, Cape Elizabeth; John W. McManus, Portland, both of Maine

[73] Assignee: William Underwood Company, Watertown, Mass.

[22] Filed: Oct. 29, 1971

[21] Appl. No.: 193,711

[52] U.S. Cl. .................... 126/374, 126/380, 99/330
[51] Int. Cl. ............................................. A47j 27/00
[58] Field of Search ........... 126/374, 376, 377, 380; 99/330; 62/218

[56] References Cited
UNITED STATES PATENTS

| | | | |
|---|---|---|---|
| 1,261,878 | 4/1918 | West | 126/374 |
| 2,357,634 | 9/1944 | Crites | 126/377 X |
| 2,827,379 | 3/1958 | Phelan | 99/330 X |
| 2,994,320 | 8/1961 | Roschadel | 126/376 |
| 3,095,463 | 6/1963 | Chang et al. | 126/376 X |
| 3,222,500 | 12/1965 | Small et al. | 126/374 X |
| 3,391,547 | 7/1968 | Kingston | 62/218 |

*Primary Examiner*—Meyer Perlin
*Assistant Examiner*—Ronald C. Capossela
*Attorney, Agent, or Firm*—W. R. Hulbert

[57] ABSTRACT

Apparatus for baking a pot of beans comprising an oven for receiving therein and heating the pot, a water distributer to discharge water into the pot while the pot is in the oven, a water supply piped to the water distributer, a valve for regulating flow of water from the water supply to the distributer, a fluid level sensor for sensing the level of fluid in the pot while the pot is in the oven, a controller responsive to the sensor and controlling the valve, the controller being operatively connected to maintain during baking the level of fluid in the pot within a predetermined range. Method for baking a pot of food comprising the steps placing the pot in an oven, placing a water distributer in position to discharge water into the pot, installing a liquid level detector in position to detect the level of liquid in the pot while in the oven, connecting the level detector and the water distributer to automatic control equipment responsive to the level detector and operative to control flow of water to the water distributer to maintain the level of liquid in the pot between predetermined limits, applying heat to the pot for baking the food therein, removing from its installed position and cleaning the detector when the food is finished baking, removing from its installed position and cleaning the distributer when the food is finished cooking.

6 Claims, 1 Drawing Figure

PATENTED JAN 29 1974 3,788,302
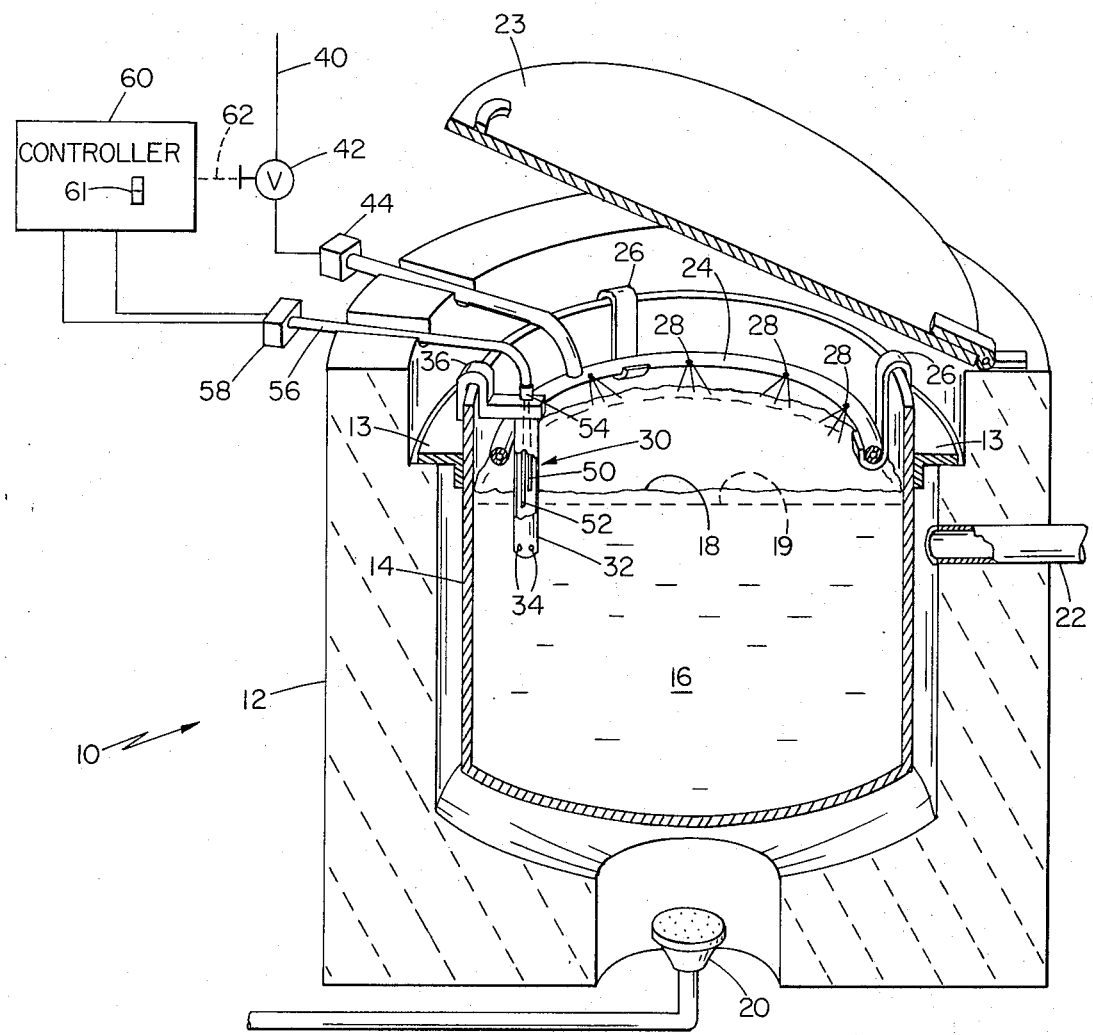

MAINTAINING THE WATER LEVEL IN BAKING BEANS

BACKGROUND OF THE INVENTION

This invention relates to the baking of beans or other food baked in pots.

As beans are baked, the watery fluid in which the beans are immersed is gradually reduced by boiling away. It has been the practice for an operator to periodically inspect the bean pot and add water to the pot when the fluid in the pot fell below a desired level. This procedure relies on the judgement of the operator both as to when and how much water to add to the pot with the result that the baking conditions for the beans are variable and the quality of the product is impaired.

SUMMARY OF THE INVENTION

The objects of this invention include producing a better quality and more uniform baked bean product, maintaining more uniform and reproducible conditions in the baking of beans, maintaining a nearly constant fluid level in a bean pot during baking, and reducing the cost of baking beans.

The invention features apparatus for baking a pot of beans comprising an oven for receiving therein and heating the pot, a water distributer to discharge water into the pot while the pot is in the oven, a water supply piped to the water distributer, a valve for regulating flow of water from the water supply to the distributer, a fluid level sensor for sensing the level of fluid in the pot while the pot is in the oven, a controller responsive to the sensor and controlling the valve, the controller being operatively connected to maintain during baking the level of fluid in the pot within a predetermined range. A specific embodiment features a water distributer in the form of a ring for discharge of water around the periphery of the bean pot and attached to a hanger for supporting it from the pot in a predetermined position relative to the pot and for removing it therefrom; a sensor with an outer tube attached to a hanger for supporting the tube from the pot in a predetermined position relative to the pot and for removing it therefrom, the tube having an aperture at one end for communication with the contents of the pot, the aperture being submerged below the level of the pot contents when the tube is in its predetermined position; and a controller with a higher control level and a lower control level 3 percent less than the higher control level, the controller operating to open the valve when the fluid level in the pot declines to the lower control level and to close the valve when the level rises to the upper control level.

Another aspect of the invention features the method for baking a pot of food comprising the steps of placing the pot in an oven, placing a water distributer in position to discharge water into the pot, installing a liquid level detector in position to detect the level of liquid in the pot while in the oven, connecting the level detector and the water distributer to automatic control equipment responsive to the level detector and operative to control flow of water to the water distributer to maintain the level of liquid in the pot between predetermined limits, applying heat to the pot for baking the food therein, removing from its installed position and cleaning the detector when the food is finished baking, removing from its installed position and cleaning the distributer when the food is finished cooking.

Other objects, features and advantages will appear from the drawing and the ensuing description of a preferred embodiment.

BRIEF DESCRIPTION OF THE DRAWING

The FIGURE shows in a cut away view beans being baked in apparatus according to the invention.

DESCRIPTION OF A PREFERRED EMBODIMENT

Referring to the FIGURE, bean baker 10 includes oven 12, within which is supported by bracket 13 pot 14 holding beans 16 covered with sauce up to level 18. Burner 20 heats the oven and combustion products are vented through flue 22. Cover 23 closes over oven 12. Ring shaped water distributer 24 is attached to hangers 26 which support the distributer from the lip of pot 14 in a predetermined position around the periphery of the pot and permit removal of the distributer for cleaning. Distributer 24 has several orifices 28 through which water may be discharged into pot 14. Water supply main 40 is piped through solenoid operated valve 42 and connector 44 to distributer 24.

Fluid level sensor 30 includes an outer tube 32 with several apertures 34 at its lower end for communication with the contents of the pot. Tube 32 is attached to hanger 36 which supports the tube from the lip of pot 14 in a predetermined position and permits removal of the tube for cleaning. When tube 32 is in its predetermined position in a pot filled with beans, apertures 34 lie beneath liquid surface 18 so that the watery component of the bean sauce may enter the tube but the fatty component of the sauce which gathers at the top surface 18 is excluded from the interior of the tube. The exclusion of the fat from the tube interior facilitates cleaning of the sensor 30. Electrical electrodes 50 and 52 are supported by insulated mounting 54 to extend within tube 32, electrode 50 extends downward to level 18 and electrode 52 extends slightly further down tube 32 to level 19. Electrodes 50 and 52 are connected by leads running through cable 56 to connector 58 and thence to controller 60. Tube 32 is electrically grounded. Solenoid operated valve 42 is connected to controller 60 through cable 62.

In the preferred embodiment controller 60 includes a snap operated relay which is connected to open valve 42 when electrode 52 becomes ungrounded and maintain the valve open until electrode 50 becomes grounded. Such control circuits are well known and need no further description here. Controller switch 61 connected to controller 60 permits an operator to put the controller in an operate or a standby mode.

In operation, pot 14, charged with beans, water, and other ingredients is placed in oven 12. Water distributer 24 is then placed in position within the pot by hanging it on hangers 26 and connected to the output of valve 42 through connector 44. Tube 32 with affixed electrodes 50 and 52 is then installed by hanging it on the lip of the pot so that apertures 32 are immersed in the contents of the pot. As tube 32 is installed the fluid in the pot enters tube 32 through apertures 34 and rises within the tube to the level 18. Cable 56 is then connected to connector 58. Cover 23 is then closed, controller 60 is switched to the monitor mode, burner 20 is put on, to apply heat to the pot, and baking commences. As the baking proceeds, water is gradually boiled away and the level of the sauce in the pot falls to level 19 at which point the sauce within tube 32 drops below the end of electrode 52 with the result that electrode 52 ceases to be grounded to tube 32. This condition stimulates controller 60 to open solenoid operated valve 42 and admit water to distributer 24 whence it is discharged into the pot. When sufficient water has been added to the pot to bring the contents up to level 18 electrode 50 is grounded to tube 32 by the fluid. Controller 60 responds to this condition by closing valve 42 and thus terminating the addition of water to the pot. Throughout the baking period the above described events are repeated with the water boiling away and then replenished automatically. Since the levels 18 and 19 differ by only a small amount (3 percent in the preferred embodiment) the water content of the cooking beans is maintained very nearly constant during the bake with a consequent high and uniform quality of product. After the bake is completed, sensor 30 and distributer 24 are disconnected, removed from oven 12 and cleaned. At this point the baking apparatus is ready to receive another pot of beans for baking.

What is claimed is:

1. The method for cleaning and maintaining the water level in pots of beans baking comprising the steps for:

placing a pot of beans with sauce in an oven, placing a water distributor in position to discharge water into said pot in said oven, installing in a predetermined position in said pot in said oven a liquid level sensor with an outer tube having near an end thereof an aperture for communication to the interior thereof, said position being such that said aperture is beneath the fatty layer accumulating at the top of baking beans, thereby excluding the fatty component of bean sauce from the interior of said tube, connecting said level detector and said water distributor to automatic control equipment responsive to said level detector and operative to control flow of water to said water distributor to maintain the level of liquid in said pot between predetermined limits, applying heat to said pot for baking said food therein, removing from its installed position and cleaning said detector when the beans are finished baking, removing from its installed position and cleaning said distributor when said beans are finished cooking.

2. Apparatus for automatically maintaining the water level in a pot of beans baking in an oven comprising a water distributor for discharging water into a pot of beans baking in an oven, said distributor being connected to a water supply for supplying water thereto, a fluid level sensor means for sensing the level of fluid in a pot of beans during baking including outer tube means with an end for insertion into the contents of a pot of baking beans, said tube means having an aperture near said end for communication to the interior of said tube, a support for said sensor tube means for holding said tube in a predetermined position within a pot while beans are baking therein while permitting removal of said tube means from the pot upon completion of the baking, said position being such that said aperture is beneath the fatty layer accumulating at the top of baking beans, the fatty component of bean sauce being excluded from the interior of said tube means, and a controller connected to said sensor means to be responsive thereto and to regulate the flow of water to said distributor.

3. The apparatus of claim 2, said distributer being in the form of a ring for discharge of water around the periphery of said pot.

4. The apparatus of claim 3 wherein said distributer is attached to a hanger for supporting said distributer on said pot in a predetermined position relative to said pot and for removing said distributer.

5. The apparatus of claim 2 wherein said controller has a higher and a lower control level and operates to open a valve when the fluid level in said pot declines to the lower control level and to close said valve when the fluid level rises to the upper control level.

6. The apparatus of claim 5 wherein said lower control level is 3 percent less than said upper control level.

* * * * *